US008842753B2

(12) United States Patent
Janani et al.

(10) Patent No.: US 8,842,753 B2
(45) Date of Patent: Sep. 23, 2014

(54) ORTHOGONAL FREQUENCY DIVISION MULTIPLEXED (OFDM) DEMODULATOR IMBALANCE ESTIMATION

(75) Inventors: Mohammad Janani, Plano, TX (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

(21) Appl. No.: 13/169,172

(22) Filed: Jun. 27, 2011

(65) Prior Publication Data

US 2012/0328053 A1    Dec. 27, 2012

(51) Int. Cl.
*H04K 1/10* (2006.01)
*H04L 27/28* (2006.01)
*H04L 27/38* (2006.01)
*H04L 27/26* (2006.01)

(52) U.S. Cl.
CPC ........ *H04L 27/2657* (2013.01); *H04L 27/3863* (2013.01)
USPC ............ 375/260; 375/296; 375/346; 375/261

(58) Field of Classification Search
CPC ........................... H04L 27/06; H04L 27/2657
USPC .......................... 375/260, 261, 262, 296, 346
See application file for complete search history.

(56) References Cited

U.S. PATENT DOCUMENTS

| 7,362,814 | B2 | 4/2008 | Sugar | |
| 7,817,734 | B2 | 10/2010 | Subramanyam et al. | |
| 8,064,550 | B2 * | 11/2011 | Chrabieh et al. | 375/343 |
| 2008/0219386 | A1 * | 9/2008 | Chrabieh et al. | 375/343 |
| 2011/0135036 | A1 * | 6/2011 | Andgart et al. | 375/316 |

OTHER PUBLICATIONS

Alireza Tarighat et al. "Joint Compensation of Transmitter and Receiver Impairments in OFDM Systems," IEEE Transactions on Wireless Communications, vol. 6, No. 1, dated Jan. 2007, 8 pages.

* cited by examiner

*Primary Examiner* — Qutbuddin Ghulamali
(74) *Attorney, Agent, or Firm* — Edell, Shapiro & Finnan, LLC

(57) ABSTRACT

Techniques are provided for generating an estimate of the phase and magnitude imbalance of a receiver in a communication device. For each of a plurality of symbols in a signal received by the communication device, a plurality of tones that make up the symbol are obtained. For each of the plurality of symbols, each tone is multiplied by its respective mirror tone to produce a plurality of mirror tone multiplication results, and the plurality of the mirror tone multiplication results are summed over tones to produce a sum of multiplication results for each symbol. The total power of all tones for each symbol is obtained to produce a tone power quantity for each symbol. The estimate of the phase and magnitude imbalance in the received signal is generated based on the sum of the multiplication results for each of the plurality of symbols and the tone power quantity for each of the plurality of symbols.

22 Claims, 4 Drawing Sheets ations for one example method for estimating receiver imbalance.

ORTHOGONAL FREQUENCY DIVISION MULTIPLEXED (OFDM) DEMODULATOR IMBALANCE ESTIMATION

TECHNICAL FIELD

The present disclosure relates to the interference-resilient estimation of phase and quadrature imbalance in an OFDM communication device.

BACKGROUND

Orthogonal Frequency Division Multiplexed (OFDM) transmission schemes are widely used in digital communications, including wireless networking, television and audio broadcasting, internet access, etc. In an OFDM scheme, the overall system bandwidth is partitioned into a number of orthogonal subcarrier frequencies, commonly referred to as tones. A stream of informational bits is converted to a series of frequency-domain symbols, and these symbols are transmitted over the subcarrier frequencies. Each subcarrier is modulated with a modulation scheme, such as quadrature amplitude modulation, phase-shift keying, etc. OFDM is used in the IEEE 802.11 wireless local area networking standards.

OFDM systems, like other wireless systems, are susceptible to the effects of residual carrier offsets, phase noise, and phase and quadrature imbalance. These impairments may cause interference between the separate symbols, referred to as inter-symbol interference (ISI), which can degrade system performance.

DESCRIPTION OF EXAMPLE EMBODIMENTS

Overview

Techniques are provided for generating an estimate of the phase and magnitude imbalance of a receiver in a communication device. For each of a plurality of symbols in a signal received by the communication device, a plurality of tones that make up the symbol are obtained. For each of the plurality of symbols, each tone is multiplied by its respective mirror tone to produce a plurality of mirror tone multiplication results, and the plurality of the mirror tone multiplication results are summed over tones to produce a sum of multiplication results for each symbol. The total power of all tones for each symbol is obtained to produce a tone power quantity for each symbol. The estimate of the phase and magnitude imbalance in the received signal is generated based on the sum of the multiplication results for each of the plurality of symbols and the tone power quantity for each of the plurality of symbols.

In one form, generating the estimate of the phase and magnitude imbalance comprises summing the multiplication results for each symbol over the plurality of symbols to produce a total multiplication sum, summing the total tone power quantity for each symbol over the plurality of symbols to produce a total power sum, and dividing the total multiplication sum by the total power sum.

In another form, generating the estimate of the phase and magnitude imbalance comprises, for each respective symbol, dividing the sum of multiplication results with its corresponding total tone power quantity to produce an imbalance quantity, and averaging the imbalance quantities over the plurality of symbols. Averaging the imbalance quantities over the plurality of symbols may comprise adding the imbalance quantity computed for each symbol over the plurality of symbols to produce a sum imbalance quantity, and dividing the sum imbalance quantity by the number of the plurality of symbols.

Example Embodiments

Figure 1:
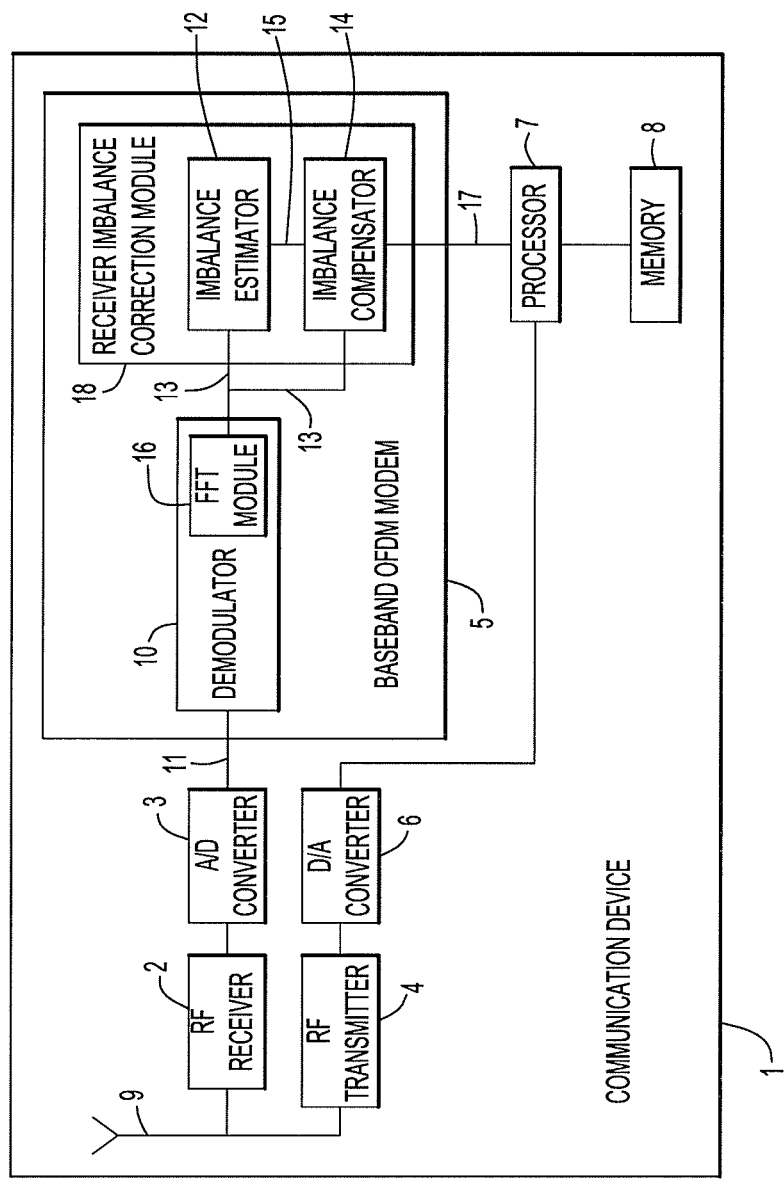
FIG. 1 is a block diagram of an example OFDM receiver in which interference-resilient receiver imbalance estimation may be implemented.

FIG. 1 is a block diagram of a communication device 1 in which interference-resilient imbalance estimation techniques may be implemented. Device 1 includes a radio-frequency (RF) receiver 2, an analog-to-digital (A/D) converter 3, an RF transmitter 4, and a digital-to-analog (D/A) converter 6. RF receiver 2 and RF transmitter 4 are connected to an antenna 9.

Device 1 also includes a processor 7, memory 8 and a baseband OFDM modem 5 that comprises a demodulator 10 and a receiver imbalance correction module 18. Demodulator 10 includes a Fast Fourier Transform (FFT) module 16, while receiver imbalance correction module 18 includes an imbalance estimator circuit 12 and an imbalance compensator circuit 14. The modem 5 and receiver imbalance correction module may be implemented by a digital signal processor, digital logic gates in fixed or programmable form, as well as software instructions executed by a processor.

In operation, RF receiver 2 receives an RF signal via the antenna 9. The RF signal is then processed by A/D converter 3 to produce a digital modulated input signal 11. Input signal 11 is provided to demodulator 10 in baseband OFDM modem 5. Demodulator 10 performs one of a number of functions to separate the informational content of modulated signal 11 from a carrier signal. That is, the demodulator 10 converts the RF signals received by receiver 2 into complex in-phase (I) and quadrature (Q) baseband signals 13 containing the desired information. This demodulation is performed, at least in part, through the use of FFT module 16. Demodulation and the use of FFTs are well known in the art and are not described further detail herein.

The conversion of the radio-frequency signals to complex I and Q baseband signals 13 may introduce phase and/or amplitude distortions, collectively referred to herein as phase and magnitude, IQ, or receiver imbalance. Such IQ imbalance contributes to the interference between the symbols in the OFDM signal, referred to herein as inter-symbol interference (ISI), which degrades the performance of the receiver. Performance degradation is particularly problematic when higher order constellation modulations, such as 64 quadrature amplitude modulation (64-QAM) or 256-QAM, are used, or in circumstances including more than two spatial streams. Devices that downcovert a radio-frequency signal directly to baseband, referred to as direct-conversion receivers, suffer increased IQ imbalance, particularly when higher frequency bands are used. As such, IQ imbalance may be a limiting factor for certain modulation schemes.

To reduce the effects of the IQ imbalance, baseband OFDM modem 5 of FIG. 1 includes imbalance correction module 18 that implements an interference-resilient method or algorithm to estimate the IQ imbalance of device 1. Module 18 is further configured to use the estimated imbalance to correct ISI in the demodulated signals. As described in further detail below, the imbalance estimation method is referred to as being interference-resilient because it operates with substantially any received signal, regardless of the informational content, noise or interference.

As shown in FIG. 1, correction module 18 comprises imbalance estimator 12 and imbalance compensator 14. Imbalance estimator 12 is configured to implement the above mentioned method to generate an estimate of the IQ imbalance introduced during demodulation of signal 11. More specifically, estimator 12 is configured to obtain, for each of a plurality of symbols in received signal 11, a plurality of tones that make up the symbol. This is performed at the output of FFT module 16. For each of the plurality of symbols, estimator 12 is configured to multiply each tone by its respective mirror tone to produce a plurality of mirror tone multiplication results. Next, estimator 12 is configured to sum the plurality of mirror tone multiplication results over tones to produce a sum of multiplication results for each symbol, and to obtain the total power of all tones for each symbol to produce a tone power quantity for each symbol. Estimator 12 is configured to generate an estimate of the IQ imbalance in the received signal based on the sum of multiplication results for each of the plurality of symbols and the tone power quantity for each of the plurality of symbols.

According to the techniques described herein, the estimate of the IQ imbalance ($K_r$) may be generated using a closed formula as shown below in Equation (1).

$$K_r = \frac{\sum_{Symbols} \sum_{K=2}^{N/2} Y_k \cdot Y_{N-k+2}}{\sum_{Symbols} \sum_{\substack{K=2 \\ K \neq N/2+1}}^{N} Y_k \cdot Y_k^*} \quad \text{Equation (1)}$$

In Equation (1), the only coherent combined term in the numerator that is boosted through summation is $K_r$ multiplied by the sum power of tone k and its mirror, mathematically shown below as:

$$K_r[(|\beta_k|^2|c_k|^2 + |\beta_{N-k+2}|^2|c_{N-k+2}|^2) + |\mu_r^2 n^2(k)| + |\mu_r^2 n^2(N-k+2)|]$$

The denominator in Equation (1) is the sum of all tone powers (the power of all tones for a given symbol), e.g., in the form of received signal strength information (RSSI).

As noted above, estimator 12 is configured to obtain a sum of multiplication results for each symbol. That is, for each of a plurality of symbols, estimator 12 performs a summation of the multiplication of a plurality of tones of the symbol with their respective mirror tones. In accordance with Equation (1), estimator 12 is further configured to sum all of these multiplication results across all symbols (i.e., add up the multiplication results for each symbol) to produce a total multiplication sum. These operations are reflected in the numerator of Equation (1) and, as such, the numerator in Equation (1) is referred to herein as a total multiplication sum.

Also as noted above, estimator 12 is configured to obtain the total power of all tones for each symbol to produce a tone power quantity for each symbol. That is, the estimator 12 sums the power of the tones in each symbol to obtain the power of all tones in each symbol. In the denominator of Equation (1), these tone power quantities for each symbol are added together to produce a total power sum. As shown in Equation (1), the total multiplication sum (numerator) is divided by the total power sum (denominator) to produce the IQ imbalance estimate.

In another form, $K_r$ may be estimated as an average over a plurality of symbols in the signal 11. In this circumstance, $K_r$ is given by Equation (2) below.

$$K_r = \frac{1}{M} \sum_{Sym=1}^{M} \left( \frac{\sum_{K=2}^{N/2} Y_k \cdot Y_{N-k+2}}{\sum_{\substack{K=2 \\ K \neq N/2+1}}^{N} Y_k \cdot Y_k^*} \right) \quad \text{Equation (2)}$$

More specifically, as noted above, estimator 12 is configured to obtain a sum of multiplication results for each symbol, and to obtain the total power of all tones for each symbol to produce a tone power quantity for each symbol. In accordance with Equation (2), for each of the plurality of symbols, estimator 12 is further configured divide the sum of multiplication results with its corresponding total tone power quantity to produce an imbalance quantity. The imbalance quantities are then averaged over the plurality of symbols to generate the estimate. More specifically, the imbalance quantities computed for each symbol are added over the plurality of symbols to produce a sum imbalance quantity. The sum imbalance quantity is then divided by the number of symbols.

When calculated $K_r$ using Equation (1) or (2), $K_r$ is a complex number ($K_r = \alpha_r - j \tan(\theta_r/2)$) having a real component that is equal to the magnitude imbalance in the receiver ($\alpha_r$), and an imaginary component from which the phase imbalance in the receiver ($\theta_r$) may be calculated.

The process or processes used to determine $\theta_r$ and/or $\alpha_r$ from the determined $K_r$ may be performed in hardware or software in imbalance estimator 12 and/or imbalance compensator 14.

Returning again to FIG. 1, estimate 15 ($K_r$) generated by estimator 12 is provided to imbalance compensator 14. Imbalance compensator 14 also receives the demodulated signal 13 from demodulator 10. Imbalance compensator 14 uses estimate 15 to perform one or more operations that correct or otherwise compensate for the receiver imbalance. In certain circumstances, estimate 15, or a signal derived there from, is applied to demodulated signal 13 to substantially eliminate the IQ imbalance. For ease of discussion, the application of estimate 15 or a derivation thereof is collectively referred to as application of estimate 15 to signal 13. As such, imbalance compensator 14 outputs a signal 17 that has been processed to reduce the effects of IQ imbalance such that signal 17 more accurately reflects the information provided by a transmitter. Signal 17 may then be provided to processor 7 and used for additional operations. Device 1 also includes a memory 8 that may be used or accessed by processor 7 and/or baseband OFDM modem 5 to perform one or more of the above or other operations.

FIG. 1 illustrates one example in which baseband OFDM modem 5 is implemented with digital logic gates in one or more application-specific integrated circuits (ASICs). However, in alternative arrangements, the operations of OFDM modem 5 may be implemented as one or more software modules stored in memory 8 that are executable by processor 7. That is, in such an arrangement, processor 7 may perform the above noted operations of the elements of OFDM modem 5, and in particular the IQ imbalance estimation and compensation operations described herein. To this end, memory 8 may comprise read only memory (ROM), random access memory (RAM), magnetic disk storage media devices, optical storage media devices, flash memory devices, electrical, optical, or other physical/tangible memory storage devices. The processor 7 is, for example, a microprocessor or microcontroller that executes instructions for the process logic stored in memory 8 to enable the processor 7 to perform the imbalance estimation operations described herein. Thus, in general, the memory 8 may comprise one or more computer readable storage media (e.g., a memory device) encoded with software comprising computer executable instructions and when the software is executed (by the processor 7) it is operable to perform the imbalance estimation and compensation operations described herein.

Figure 2:
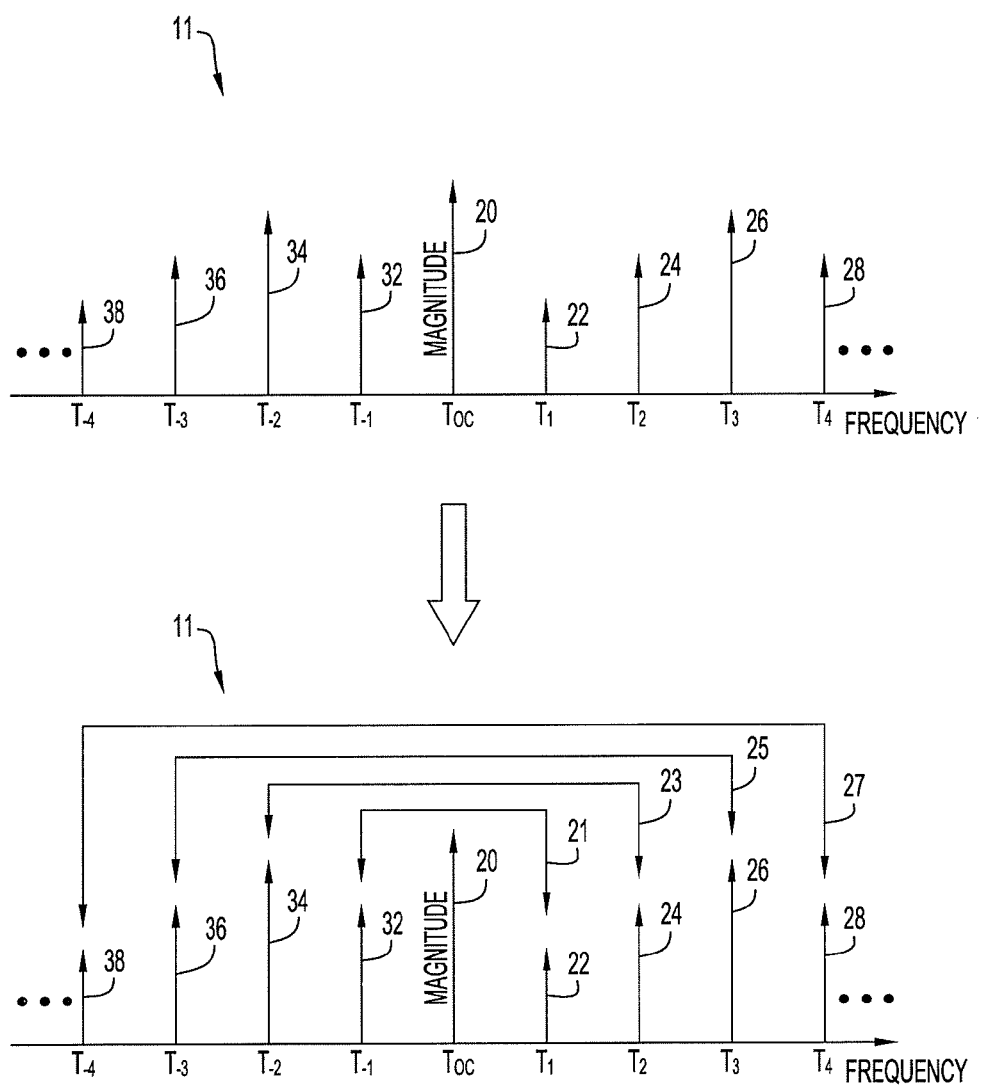
FIG. 2 illustrates plots generally depicting operation of the interference-resilient receiver imbalance estimation techniques in connection with a plurality of tones of a received OFDM symbol.

As previously noted, in an OFDM system a stream of informational bits is converted to a series of frequency-domain symbols that are transmitted over tones. The number of tones utilized may vary depending on, for example, the particular modulation scheme. FIG. 2 shows plots illustrating an example of one variation of signal 11 of FIG. 1 (in the frequency domain) in which the signal was modulated using M-QAM, wherein M is an integer with the power of 2. For example, M may be 2, 4, 8, 16, 32, 64, 128 or 256. For ease of description, FIG. 2 illustrates a subset of tones that may make up a symbol, e.g., the DC tone 20, four (4) tones ($T_1$ 22, $T_2$ 24, $T_3$ 26, and $T_4$ 28) on the upper frequency side of the DC tone, and the mirror tones for each of these four tones. As used herein, mirror tones are tones that are equidistant from DC tone 20 as a tone of the upper frequency side, but are on the opposing sides of the DC tone. As such, in the arrangement of FIG. 2, tone $T_{-1}$ 32 is the mirror tone of $T_1$ 22. Similarly, tones $T_{-2}$ 34, $T_{-3}$ 36 and $T_{-4}$ 38 are mirror tones of tones $T_2$ 24, $T_3$ 26, and $T_4$ 28, respectively.

As noted above, the interference-resilient method generates the estimate of the receiver imbalance, in part, by multiplying each signal at a tone by its respective mirror tone. Therefore, with reference to the bottom graph of FIG. 2, the signals at tones (simply referred to herein as tones) $T_1$ 22, $T_2$ 24, $T_3$ 26, and $T_4$ 28 are multiplied by its respective mirror tone. That is, as shown by arrow 21, tone $T_1$ 22 is multiplied by tone $T_{-1}$ 32, and, as shown by arrow 23, tone $T_2$ 24 is multiplied by tone $T_{-2}$ 34. Similarly, as shown by arrow 25, tone $T_3$ 26 is multiplied by tone $T_{-3}$ 36, and, as shown by arrow 27, tone $T_4$ 28 is multiplied by tone $T_{-4}$ 38.

Figure 3:
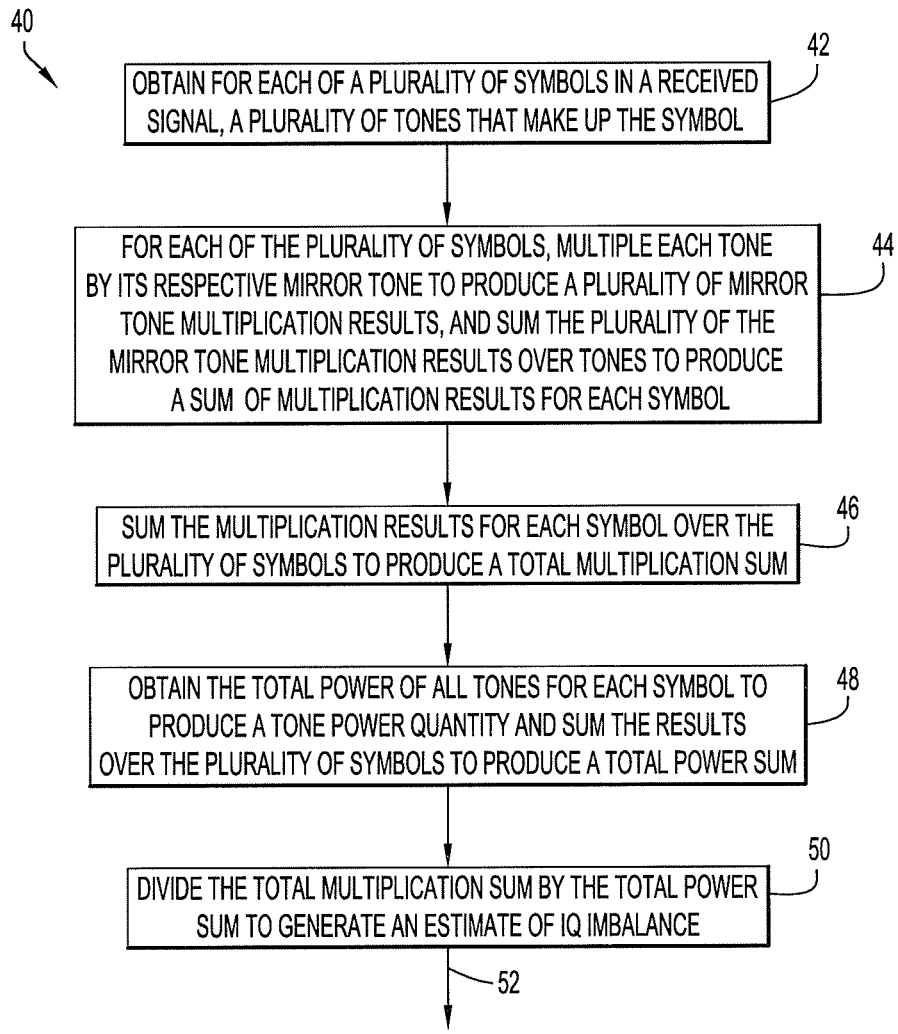
FIG. 3 is a flowchart illustrating operations for one example method for estimating receiver imbalance.

FIG. 3 is a flowchart of one interference-resilient method 40 in accordance with one form that may be implemented by a communication device. Method 40 begins at 42 where, for each of a plurality of symbols in the received signal, a plurality of tones that make up the symbol are obtained. At 44, for each of the plurality of symbols, each tone is multiplied by its respective mirror tone to produce a plurality of mirror tone multiplication results, and the plurality of the mirror tone multiplication results are summed over tones to produce a sum of multiplication results for each symbol. At 46, the sum of multiplication results for each symbol are summed over the plurality of symbols to produce a total multiplication sum. At 48, the total power of all tones for each symbol are obtained to produce a tone power quantity, and these are summed over the plurality of symbols to produce a total power sum. At 50, the total multiplication sum is divided by the total power sum to generate the estimate of IQ imbalance.

Figure 4:
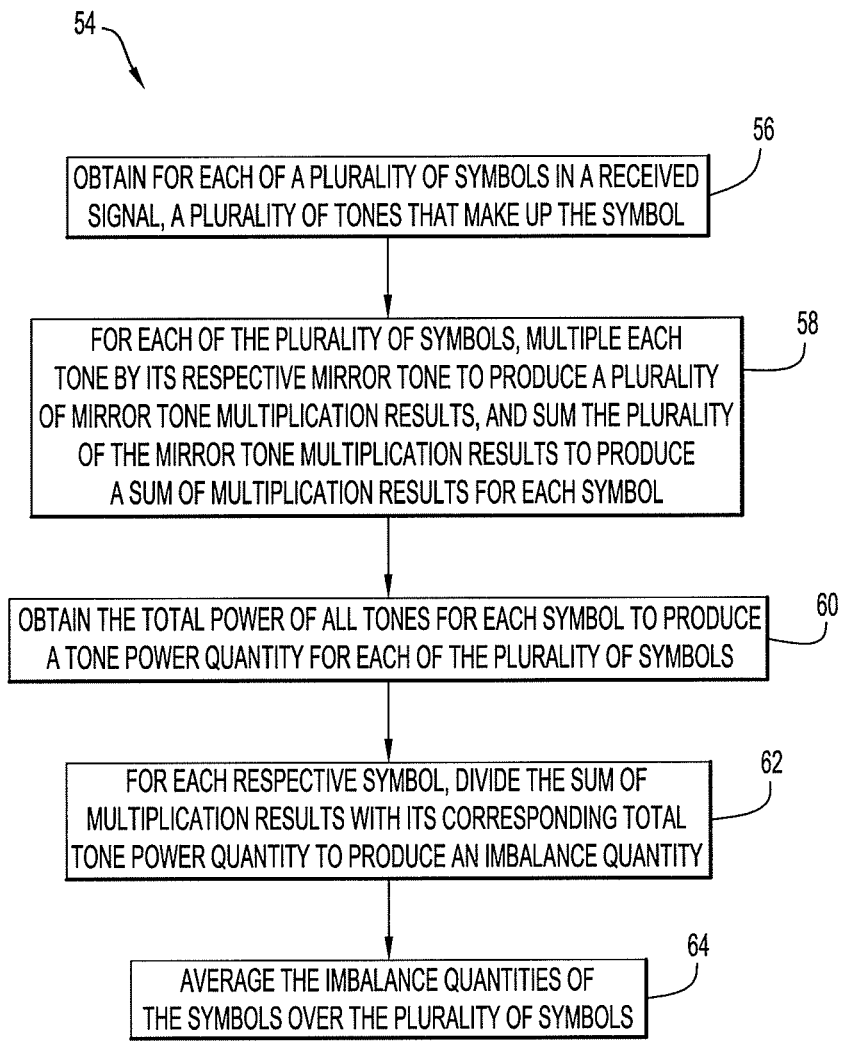
FIG. 4 is a flowchart illustrating operations for another example method for estimating receiver imbalance.

FIG. 4 is a flowchart of another interference-resilient method 54 in accordance with one aspect that may be implemented by a communication device. Method 54 begins at 56 where, for each of a plurality of symbols in the received signal, a plurality of tones that make up the symbol are obtained. At 58, for each of the plurality of symbols, each tone is multiplied by its respective mirror tone to produce a plurality of mirror tone multiplication results, and the plurality of the mirror tone multiplication results are summed over tones to produce a sum of multiplication results for each symbol. At 60, the total power of all tones for each symbol is obtained to produce a tone power quantity for each of the plurality of symbols. At 62, for each respective symbol, the sum of multiplication results is divided by its corresponding total tone power quantity to produce an imbalance quantity. At 64, the average of the imbalance quantities of the symbols is computed to generate the estimate. The averaging of the imbalance quantities of the symbols includes adding the imbalance quantity for each symbol over the plurality of symbols to produce a sum imbalance quantity, and then dividing the sum imbalance quantity by the number of symbols.

Once the estimate of the IQ imbalance is generated using one of the above described methods, the estimate may be used in different ways to adjust the demodulated signals so as to compensate for the receiver imbalance. For example, the estimate may be used to correct the modulator phase imbalance in IQ paths, or to correct the imbalance through digital signal processing methods.

The interference-resilient methods described herein have a number of benefits. In particular, the methods do not require large amounts of computing power to implement. Furthermore, the outcome of these methods are substantially independent of the type or arrangement of the received signal, and is not affected by interference, white or colored noise, time or frequency offsets, or rouge transmissions from, for example, cameras, microwave ovens, Bluetooth® devices, etc. In fact, due to the mathematical structure of the methods described herein, these methods will provide an estimate of the IQ imbalance even if noise or interference is contained in the received signal, or if only noise or other interference is received. Accordingly, these methods are said to be interference-resilient. Additionally, because the methods operate on the received signal, there is no need for a prior training sequence or knowledge of the transmitter imbalance. Furthermore, the method may be implemented such that it may be interrupted without loss of information, and can continue running at a later time.

Aspects have been primarily described herein with reference to the use of the method in a communication device that is configured to receive an OFDM signal. However, it should be appreciated that the interference-resilient method may be implemented in connection with OFDM variant schemes including, but not limited to, Coded Orthogonal Frequency Division Multiplexing (COFDM), Flash Orthogonal Frequency Division Multiplexing (FOFDM), Orthogonal Frequency Division Multiple Access (OFDMA), Vector Orthogonal Frequency Division Multiplexing (VOFDM), Wideband Orthogonal Frequency Division Multiplexing (WOFDM), or other schemes implemented under the 802.11, 802.16 or Long Term Evolution (LTE) standards. The method may also be used with different QAM and other digital modulation schemes implemented in OFDM.

The above description is intended by way of example only.

What is claimed is:

1. A method performed at a communication device comprising:
    obtaining for each of a plurality of symbols in a received signal, a plurality of received tones that make up the symbol;
    for each of the plurality of symbols, multiplying each received tone by its respective mirror tone to produce a plurality of mirror tone multiplication results;

summing the plurality of the mirror tone multiplication results to produce a sum of multiplication results for each symbol;

obtaining the total power of all received tones for each symbol to produce a tone power quantity for each symbol; and generating, at the communication device, an estimate of the phase and magnitude imbalance in the received signal based on the sum of multiplication results for each of the plurality of symbols and the tone power quantity for each of the plurality of symbols.

2. The method of claim 1, wherein generating the estimate of the phase and magnitude imbalance comprises:

summing the multiplication results for each symbol over the plurality of symbols to produce a total multiplication sum;

summing the total tone power quantity for each symbol over the plurality of symbols to produce a total power sum; and dividing the total multiplication sum by the total power sum to generate the estimate.

3. The method of claim 1, wherein generating the estimate of the phase and magnitude imbalance comprises:

for each respective symbol, dividing the sum of multiplication results with its corresponding total tone power quantity to produce an imbalance quantity; and averaging the imbalance quantities of the symbols over the plurality of symbols to generate the estimate.

4. The method of claim 3, wherein averaging the imbalance quantities of the symbols comprises:

adding the imbalance quantity for each symbol over the plurality of symbols to produce a sum imbalance quantity; and dividing the sum imbalance quantity by the number of the plurality of symbols.

5. The method of claim 1, further comprising:

applying the estimate of the phase and magnitude imbalance to the received signal to compensate for the receiver imbalance.

6. The method of claim 1, wherein obtaining a plurality of received tones that make up the symbol comprises:

obtaining tones associated with received noise at the receiver.

7. The method of claim 1, further comprising:

downconverting a radio-frequency signal directly to baseband to produce the received signal.

8. The method of claim 1, wherein obtaining the plurality of received tones comprises:

obtaining received tones of an M quadrature amplitude modulation (M-QAM) signal, wherein M is an integer with a power of 2.

9. The method of claim 1, wherein obtaining the plurality of received tones comprises:

obtaining received tones associated with an OFDM symbol.

10. An apparatus comprising:

a demodulator configured to demodulate a received orthogonal frequency-division multiplexed (OFDM) signal; and an imbalance estimator circuit configured to obtain, for each of a plurality of symbols in the received signal, a plurality of received tones that make up the symbol, multiply, for each of the plurality of symbols, each received tone by its respective mirror tone to produce a plurality of mirror tone multiplication results, sum the plurality of the mirror tone multiplication results to produce a sum of multiplication results for each symbol, obtain the total power of all received tones for each symbol to produce a tone power quantity for each symbol, and to generate an estimate of the phase and magnitude imbalance in the received signal based on the sum of multiplication results for each of the plurality of symbols and the tone power quantity for each of the plurality of symbols.

11. The apparatus of claim 10, wherein the imbalance estimator circuit is further configured to sum the multiplication results for each symbol over the plurality of symbols to produce a total multiplication sum, sum the total tone power quantity for each symbol over the plurality of symbols to produce a total power sum, and divide the total multiplication sum by the total power sum to generate the estimate of the phase and magnitude imbalance.

12. The apparatus of claim 10, wherein the imbalance estimator circuit is further configured to, for each respective symbol, divide the sum of multiplication results with its corresponding total tone power quantity to produce an imbalance quantity, and average the imbalance quantities of the symbols over the plurality of symbols to generate the estimate the phase and magnitude imbalance.

13. The apparatus of claim 12, wherein the imbalance estimator circuit is configured to add the imbalance quantity for each symbol over the plurality of symbols to produce a sum imbalance quantity, and to divide the sum imbalance quantity by the number of the plurality of symbols to compute the average of the imbalance quantities.

14. The apparatus of claim 10, further comprising:

an imbalance compensator circuit configured to apply the estimate of the phase and magnitude imbalance to the received signal to compensate for the demodulator imbalance.

15. The apparatus of claim 10, wherein the demodulator is configured to demodulate only noise, and wherein the imbalance estimator circuit is configured to obtain received tones of the noise and to derive the estimate of phase and magnitude imbalance from only the received noise.

16. The apparatus of claim 10, further comprising a radio frequency receiver configured to downconvert a received radio-frequency signal directly to baseband to produce the OFDM signal.

17. The apparatus of claim 10, wherein the received signal is an M quadrature amplitude modulation (M-QAM) signal, wherein M is an integer with a power of 2.

18. One or more non-transitory computer readable storage media encoded with software comprising computer executable instructions and when the software is executed operable to:

obtain, for each of a plurality of symbols in a received signal, a plurality of received tones that make up the symbol;

for each of the plurality of symbols, multiply each received tone by its respective mirror tone to produce a plurality of mirror tone multiplication results;

sum the plurality of the mirror tone multiplication results to produce a sum of multiplication results for each symbol;

obtain the total power of all received tones for each symbol to produce a tone power quantity for each symbol; and generate an estimate of the phase and magnitude imbalance in the received signal based on the sum of multiplication results for each of the plurality of symbols and the tone power quantity for each of the plurality of symbols.

19. The non-transitory computer readable storage media of claim 18, wherein the instructions operable to generate the estimate of the phase and magnitude imbalance further comprise instructions operable to:

sum the multiplication results for each symbol over the plurality of symbols to produce a total multiplication sum;

sum the total tone power quantity for each symbol over the plurality of symbols to produce a total power sum; and divide the total multiplication sum by the total power sum.

20. The non-transitory computer readable storage media of claim 18, wherein the instructions operable to generate the estimate of the phase and magnitude imbalance further comprise instructions operable to:

for each respective symbol, divide the sum of multiplication results with its corresponding total tone power quantity to produce an imbalance quantity; and average the imbalance quantities of the symbols over the plurality of symbols to generate the estimate.

21. The non-transitory computer readable storage media of claim 20, wherein the instructions operable to average the imbalance quantities of the symbols further comprise instructions operable to:

add the imbalance quantity for each symbol over the plurality of symbols to produce a sum imbalance quantity; and divide the sum imbalance quantity by the number of the plurality of symbols.

22. The non-transitory computer readable storage media of claim 18, further comprising instructions operable to:

apply the estimate of the phase and magnitude imbalance of the device to the received signal to compensate for the imbalance.

* * * * *